Figures 1, 2:
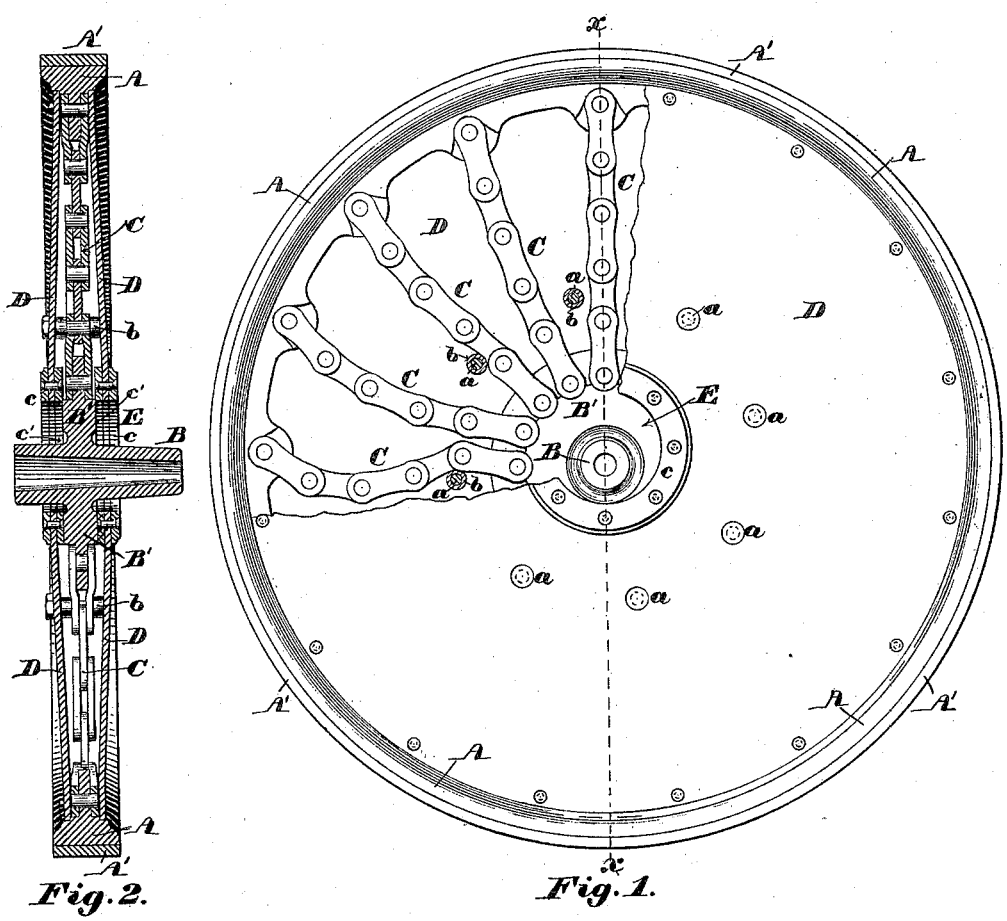

(No Model.)

W. D. ORCUTT.
WHEEL FOR HEAVY WAGONS.

No. 301,144.          Patented July 1, 1884.

Witnesses:
Walter E. Lombard.
Benjamin Holland Jr.

Inventor:
William D. Orcutt,
by N. C. Lombard
Attorney.

UNITED STATES PATENT OFFICE.

WILLIAM D. ORCUTT, OF BOSTON, MASSACHUSETTS.

WHEEL FOR HEAVY WAGONS.

SPECIFICATION forming part of Letters Patent No. 301,144, dated July 1, 1884.

Application filed February 29, 1884. (No model.)

*To all whom it may concern:*

Be it known that I, WILLIAM D. ORCUTT, of Boston, in the county of Suffolk and State of Massachusetts, have invented a new and useful Wheel for Heavy Wagons, Trucks, and Cars, of which the following, taken in connection with the accompanying drawings, is a specification.

My invention relates to a wheel for heavy wagons, trucks, or cars, and has for its object a reduction in the power required to move a given load; and it consists of a wheel composed of a rim and hub movable relative to each other and connected together by a series of chains or jointed connections in such a manner that the hub assumes a position eccentric to the rim, and that the load is always suspended from a single point at the top of the rim, which point is constantly moving around said rim as the wheel revolves.

Figure 1 of the drawings is a side elevation of my improved wheel, with a portion of one of the side plates broken away to show the interior; and Fig. 2 is a section on line $x\,x$ on Fig. 1.

A is the felly or rim of the wheel, made in one piece, preferably of metal, and may have the thin flat tire A' shrunk thereon when designed to be used upon common roads; or it may be provided with a flange, like an ordinary car-wheel, if it is to be used upon rails.

B is the hub, also of metal, and C C C are a series of chains connecting said hub to the felly or rim in such a manner that the hub assumes a position eccentric to the axis of the rim, and is suspended therefrom by a single chain, the remaining chains being more or less slack, as shown in Fig. 1. The rim A is stayed and braced against a tendency to collapse by the side plates, D D, which are bolted thereto around their outer edges, and are connected together by the bolts $a\,a$ and thimbles $b\,b$, as shown. A central opening, E, is formed in each of the plates D of sufficient size to permit the hub B, the ends of which project through said openings, to be moved independently of the rim by the draft upon the load, whereby the bearing of the load is moved forward of the line of support of the rim, so that the weight or gravity of the load tends to assist the rotation of the wheel and the consequent advancement of the load. The portions of the plates D immediately surrounding the openings E are re-enforced by the rings $c$ and $c'$, which serve to stiffen and strengthen said plate, for the purpose of adapting them the better to resist the lateral strains to which they may be subjected. The hub B is provided with the central flange or collar, B', which projects radially therefrom into the space between the rings $c\,c$, said flange B' being of a thickness equal to the distance between said rings, and moving in contact therewith when the hub B is moved relative to the rim and the plates D D in the attempt to draw the load placed upon the axle upon which said wheel is mounted. To the outer edge of the flange B' are pivoted the inner ends of a series of chains or jointed connections, the other ends of which are in like manner pivoted to the rim A, said chains being of such a length that when the wheel is placed upright upon its rim the weight of the hub and any load which may be placed thereon will be suspended from the uppermost part of said rim by a single chain, while all the other chains are more or less slack, and the hub B occupies a position eccentric to the axis of the rim A, as shown.

The wheel illustrated in the drawings is designed for use upon heavy wagons and trucks, and is therefore provided with the tire A', which may be shrunk upon the rim in the usual way, and may be removed when worn out and replaced by a new one; but it is obvious that if it is desired to use the wheel upon railways the rim A may be provided with the usual peripheral flange without affecting the principles of my invention.

The operation of my invention is as follows: The parts of the wheel being in the positions relative to each other as shown, and the hub B being loaded through the medium of an axle (not shown) upon which the wheel is mounted, if an attempt is made to move the load by drawing upon the axle and a slight trig or obstruction is presented to the free rolling of the wheel along the road or surface upon which it rests, the draft upon the axle will cause the hub B to move forward in advance of the rim, the chain by which the load is suspended from the rim swinging from its pivotal connection with said rim, when the weight or gravity of the load, acting through the chain which supports the load, assists the wheel over the obstruction and materially facilitates the drawing of the load.

What I claim as new, and desire to secure by Letters Patent of the United States, is—

A wheel composed of the rim A, hub B, provided with the flange B', the plates D D, and the chains C C, all combined, arranged, and adapted to operate substantially as and for the purposes specified.

In testimony whereof I have signed my name to this specification, in the presence of two subscribing witnesses, on this 27th day of February, A. D. 1884.

WM. D. ORCUTT.

Witnesses:
    N. C. LOMBARD,
    WALTER E. LOMBARD.